US008827224B2

(12) United States Patent
Vanderwees

(10) Patent No.: US 8,827,224 B2
(45) Date of Patent: Sep. 9, 2014

(54) MOUNTING BRACKET FOR HEAT EXCHANGER CORE FACE

(75) Inventor: Doug Vanderwees, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 1442 days.

(21) Appl. No.: 11/748,597

(22) Filed: May 15, 2007

(65) Prior Publication Data

US 2008/0283700 A1    Nov. 20, 2008

(51) Int. Cl.
    *F24H 9/06*    (2006.01)
    *F24H 3/04*    (2006.01)
    *F24H 3/06*    (2006.01)
    *F24D 19/00*   (2006.01)

(52) U.S. Cl.
    CPC ............... *F24H 3/06* (2013.01); *F24H 3/0435* (2013.01); *F24D 19/0087* (2013.01); *F24H 3/0429* (2013.01)
    USPC ............................................ 248/232; 165/67

(58) Field of Classification Search
    USPC .................................. 248/205.3, 232; 165/67
    See application file for complete search history.

(56) References Cited

U.S. PATENT DOCUMENTS

| | | | |
|---|---|---|---|
| 1,306,976 A | 6/1919 | Searles | |
| 1,429,742 A * | 9/1922 | Kehm | 248/232 |
| 1,791,924 A | 2/1931 | Florman | |
| 2,265,054 A | 12/1941 | Baker | |
| 2,879,040 A | 3/1959 | McInnes | |
| 3,061,277 A | 10/1962 | Anderson | |
| 4,441,547 A | 4/1984 | Argyle et al. | |
| 5,242,013 A | 9/1993 | Couetoux et al. | |
| 5,289,872 A | 3/1994 | Kent | |
| 5,348,079 A | 9/1994 | Tanaka | |
| 5,522,457 A | 6/1996 | Lenz | |
| 5,597,038 A | 1/1997 | Potier | |
| 5,638,894 A | 6/1997 | Potier et al. | |
| 5,771,961 A | 6/1998 | Alizadeh | |
| 5,791,402 A | 8/1998 | Dumetz | |
| 5,868,197 A | 2/1999 | Potier | |
| 5,943,986 A | 8/1999 | Kern et al. | |
| 6,017,185 A | 1/2000 | Kuo | |
| 6,032,727 A | 3/2000 | Martins | |
| 6,142,213 A | 11/2000 | Gallivan et al. | |
| 6,158,979 A | 12/2000 | Couetoux et al. | |
| 6,230,792 B1 | 5/2001 | Potier | |

(Continued)

FOREIGN PATENT DOCUMENTS

| CA | 1164858 | 4/1984 |
|---|---|---|
| EP | 183596 | 5/1988 |

*Primary Examiner* — Bradley Duckworth
(74) *Attorney, Agent, or Firm* — Marshall & Melhorn, LLC

(57) ABSTRACT

A mounting bracket for use in core device such as a heat exchanger is disclosed. The device has a plurality of tubes disposed in stacked, spaced relation such that side surfaces thereof define opposed faces of the core device. The bracket comprises a cap portion and a filler portion. The cap portion, in use, is disposed against and secured to a portion of one of the faces of the core device defined by side surfaces of a pair of adjacent tubes. The filler portion extends from the cap portion and is interleaved, in use, between the pair of adjacent tubes, and has opposed faces abutting and secured to respective portions of said adjacent tubes. The bracket can be brazed to the core device and have an aperture for threadingly receiving a threaded shaft for mounting a component to the core device. The tubes can be of the stacked-plate type.

8 Claims, 11 Drawing Sheets

(56) References Cited

U.S. PATENT DOCUMENTS

| | | |
|---|---|---|
| 6,244,331 B1 | 6/2001 | Budelman |
| 7,302,997 B2 * | 12/2007 | Kozdras et al. ............... 165/67 |
| 2005/0006052 A1 * | 1/2005 | Kozdras et al. ............... 165/67 |
| 2005/0006071 A1 * | 1/2005 | Kovac ............................ 165/140 |
| 2006/0037734 A1 * | 2/2006 | Miura ............................ 165/67 |

* cited by examiner

MOUNTING BRACKET FOR HEAT EXCHANGER CORE FACE

FIELD OF THE INVENTION

The present invention relates to methods of fastening accessories, such as radiator fans, to radiators or other heat exchangers.

BACKGROUND OF THE INVENTION

In the automotive field, it is commonplace to provide a radiator fan, to increase radiator cooling airflow, and it is traditional to secure such fan to the chassis or bodywork of the vehicle. It is also known to secure accessories such as radiator fans directly to radiators. For example, it is known to substitute, for each of one or more of the tubes of a heat exchanger, a mounting plate having at least one integral fastening lug projecting from a side edge, and to which the accessory is attached. This arrangement provides a relatively robust, inexpensive mount for the accessory. However, the substitution of mounting plates for tubes, all things remaining equal, tends to decrease heat exchange performance.

SUMMARY OF THE INVENTION

A mounting bracket forms one aspect of the invention. The bracket is for use in a stacked plate core device of the type having a plurality of tubes. Each tube is defined by a plate pair including first and second plates having peripheral edge portions joined together and central planar portions spaced apart to define a fluid passage therebetween. The tubes are disposed in stacked relation to one another such that end surfaces of the joined peripheral edge portions define opposed faces of the core device. The mounting bracket comprises a cap portion and a filler portion. The cap portion, in use, is disposed against and brazed to a portion of one of the faces of the core device defined by end surfaces of a pair of adjacent tubes. The filler portion: extends from the cap portion; is interleaved, in use, between the pair of adjacent tubes; and has opposed faces abutting and brazed to respective peripheral edge portions of said adjacent tubes.

A mounting bracket forms another aspect of the invention. The mounting bracket is for use in a core device of the type having a plurality of tubes disposed in stacked, spaced relation to one another such that end surfaces of the tubes define opposed faces of the core device. The mounting bracket comprises a cap portion and a filler portion. The cap portion, in use, is disposed against and secured to a portion of one of the faces of the core device defined by end surfaces of a pair of adjacent tubes. The filler portion extends from the cap portion and is interleaved, in use, between the pair of adjacent tubes, and has opposed faces abutting and secured to respective portions of said adjacent tubes.

This arrangement provides a relatively robust, inexpensive mount, which permits accessories such as radiator fans to be mounted to a core without the need for substituting any lug-bearing plates for the tubes. Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinbelow.

DETAILED DESCRIPTION

Figure 1:
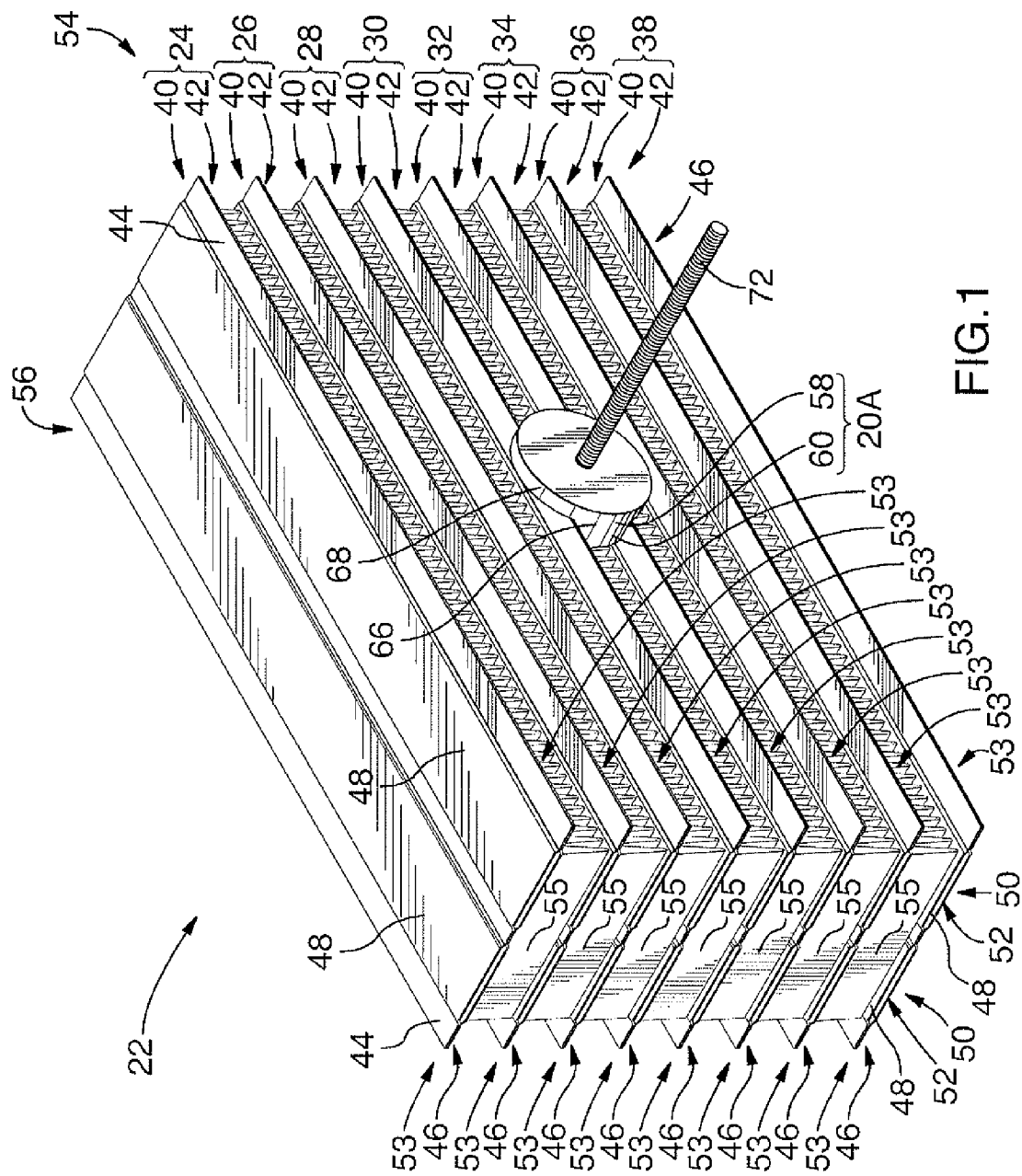
FIG. 1 is a front, top, side perspective view of a mounting bracket according to a first embodiment of the invention in use with a heat exchanger of the stacked plate type.
Figure 2A:
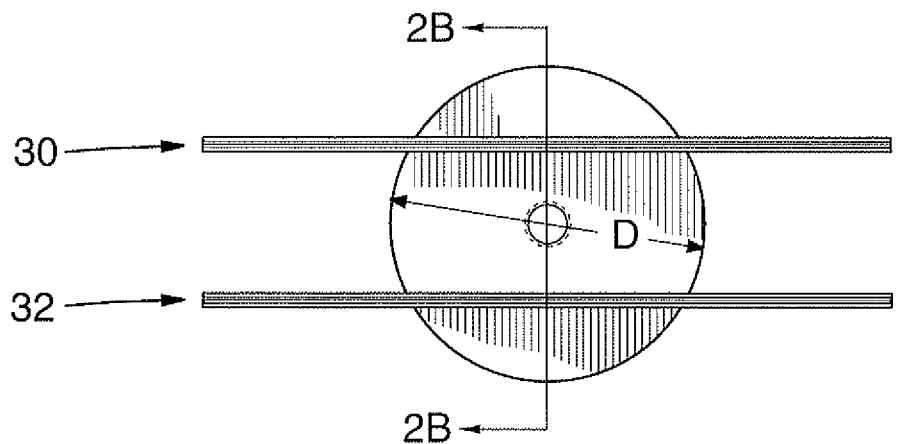
FIG. 2A is a rear view of a portion of the structure of FIG. 1.
Figure 2B:
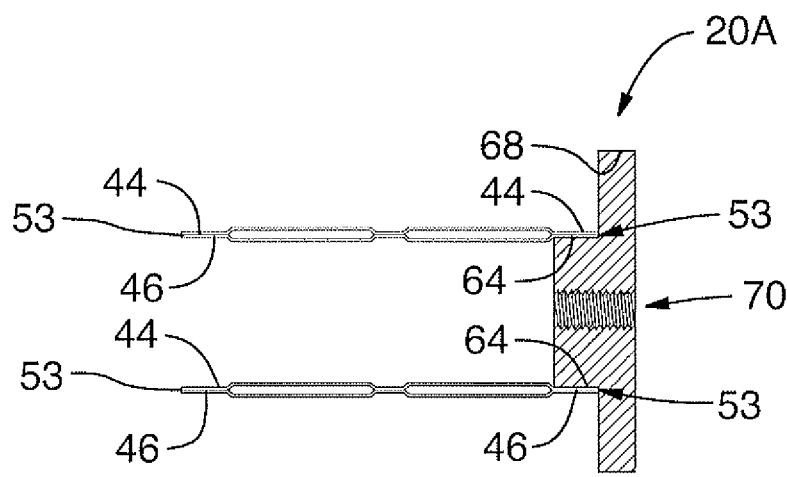
FIG. 2B is a view along section 2B-2B of the structure of FIG. 2A.
Figure 2C:
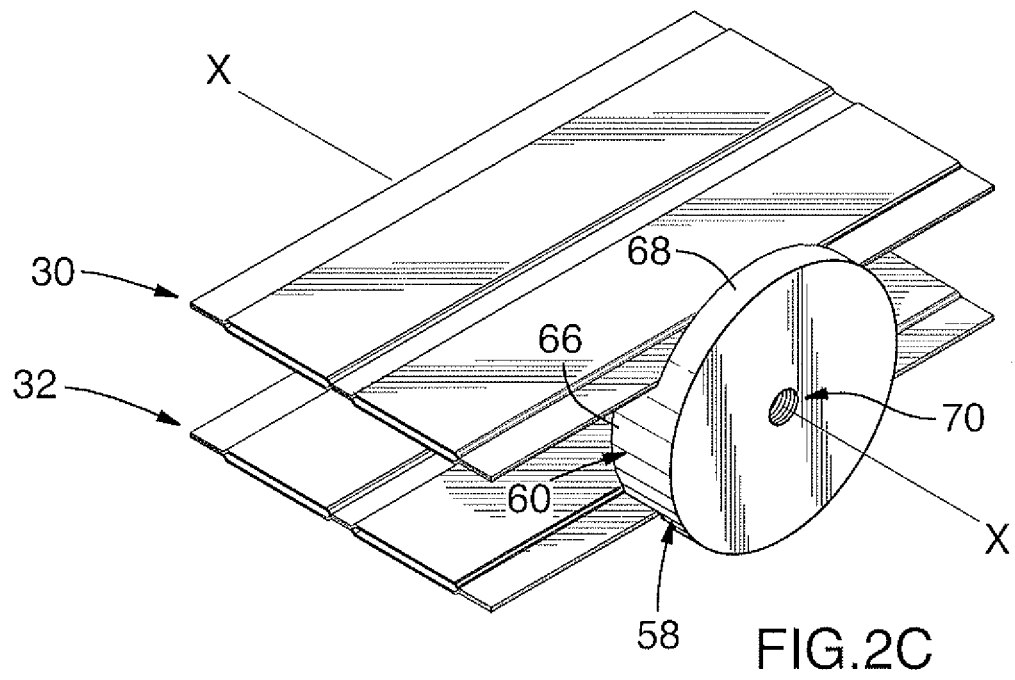
FIG. 2C is a front, top, side perspective view of the structure of FIG. 2A.

With general reference to FIGS. 1-2C, an embodiment of the present invention, a mounting bracket designated by the general reference 20A, is illustrated in use with a stacked plate core device, namely, a heat exchanger 22.

The heat exchanger 22, which for greater certainty, does not form part of the invention, is of the type having a plurality of tubes 24, 26, 28, 30, 32, 34, 36, 38 each defined by a plate pair including first 40 and second 42 plates having peripheral edge portions 44, 46 joined together by brazing and central planar portions 48, 50 spaced apart to define a pair of fluid passages 52 therebetween, the tubes 24-38 being disposed in stacked relation to one another, brazed to and spaced-apart from one another by corrugated fins 55, such that end surfaces 53 of the joined peripheral edge portions 44,46 define opposed faces 54, 56 of the core device 22.

The mounting bracket 20A comprises a cap or head portion 58 and an integral filler or stud portion 60, machined out of a single piece of 6061-T6 aluminum. The cap portion 58 takes the form of a circular disc with a 22.84 mm diameter and a 1.46 mm thickness which is disposed against and brazed to a portion of one of the faces 54 of the core device 22 defined by end surfaces 53 of a pair of adjacent tubes 30,32. The filler portion 60 extends from the cap portion 60, has a thickness of 2 mm and is interleaved between the pair of adjacent tubes 30,32 with parallel, planar opposed faces 64 of the filler portion 60 abutting and brazed to respective peripheral edge portions 44,46 of said adjacent tubes 30,32 and semi-cylindrical sides 66 of the filler portion 60 extending between the opposed faces 64 and aligned with the sidewall 68 of the cap portion 58, i.e. the cylindrical surface 68 of the disc 58 and the cylindrical surface partially defined by the sides 66 of the filler portion 60 are substantially coaxial and of a substantially common diameter D. For greater clarity, in this disclosure and in the appended claims, it should be understood that the term "semi-cylindrical" refers to a structure that is a part of a cylinder, possibly but not necessarily one-half.

The bracket 20A shown is brazed to the heat exchanger 22 in the same operation by which the various components of the heat exchanger 22 are brazed to one another.

As shown in FIGS. 2A-2C, a threaded bore 70 aligned with the axis X-X of the cylindrical surface 68 of the disc 58 extends through the mounting bracket 20A, and in use, receives a threaded shaft 72, as shown in FIG. 1. The threaded shaft 72 may, for example, be defined by the shaft of a bolt (not shown), which, in use, secures a radiator fan or other component (not shown) to the heat exchanger 22. Although only a single, central mount is shown in FIG. 1, it should be understood that, typically, a number of mounts of this type will be used to secure the fan or other accessory to the core 22.

The structure of FIGS. 1-2C can provide for a relatively secure, robust, inexpensive mount on a stacked-plate type core. However, depending upon the nature of the accessory to be mounted to the core, the number of mounts to be used and the nature of the load to be borne by the accessory, it may be advantageous to modify the mount, to distribute the load better amongst the plates and avoid fatigue fracture that could otherwise occur, as the plates which form the core are typically relatively light-gauge material.

Various modifications are possible; six further exemplary embodiments to the mount are shown in FIGS. 3A-7C.

Figure 3A:
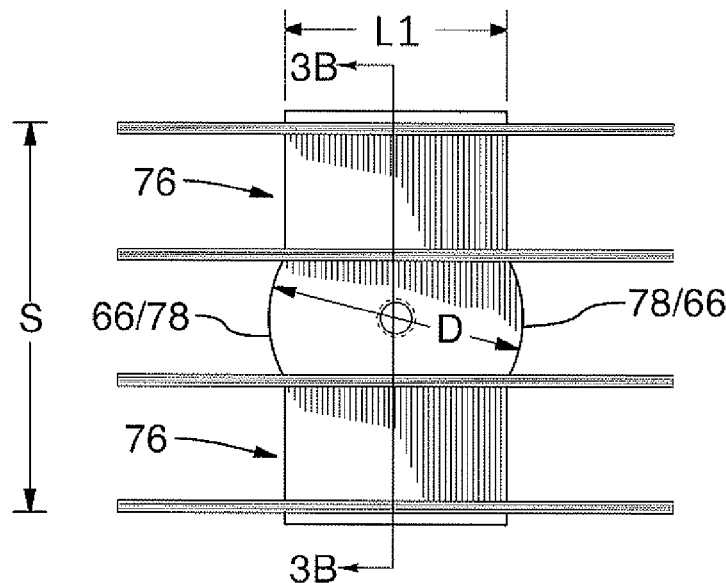
FIG. 3A is a view similar to FIG. 2A of a second embodiment of the bracket.
Figure 3B:
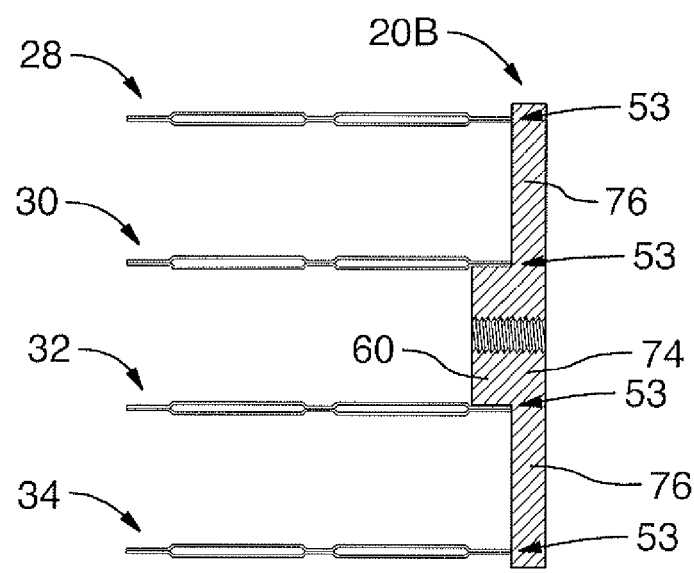
FIG. 3B is a view along section 3B-3B of the structure of FIG. 3A.
Figure 3C:
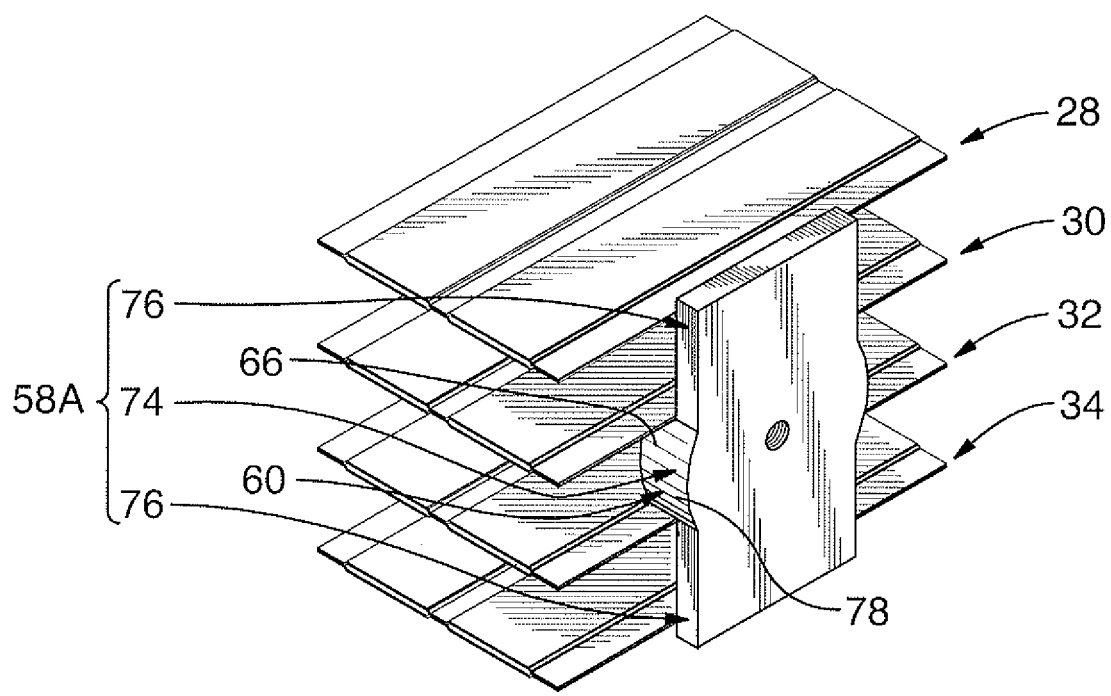
FIG. 3C is a front, top, side perspective view of the structure of FIG. 3A.

The second embodiment of the mounting bracket is shown in FIGS. 3A-3C. This mounting bracket 20B is similar to the mounting bracket 20A of FIGS. 1-2C, but wherein in FIGS. 1-2C, the cap portion 58 was a disc, in this embodiment, the cap portion is a modified cap portion 58A including a plate-like part 74 overlying the filler portion 60 and wing plates 76 of uniform thickness therewith extending from the plate-like part 74. The plate-like part 74 has semi-cylindrical sides 78 aligned with the sides 66 of the filler portion 60, i.e. a cylindrical surface partially defined by the sides 78 of the plate-like part 74 and the cylindrical surface partially defined by the sides 66 of the filler portion 60 are substantially coaxial and of a substantially common diameter D. The wing plates 76 are substantially rectangular, project from the plate-like part 74 and, in use, overlie, are disposed against and brazed to end surfaces 53 of the pair of adjacent tubes 30,32 as well as the end surfaces 53 of the tubes above 28 and below 34 said pair 30,32 over a length L1 substantially equal to one half of the spacing S between the tubes above 28 and below 32 the pair 30,32.

Figure 4A:
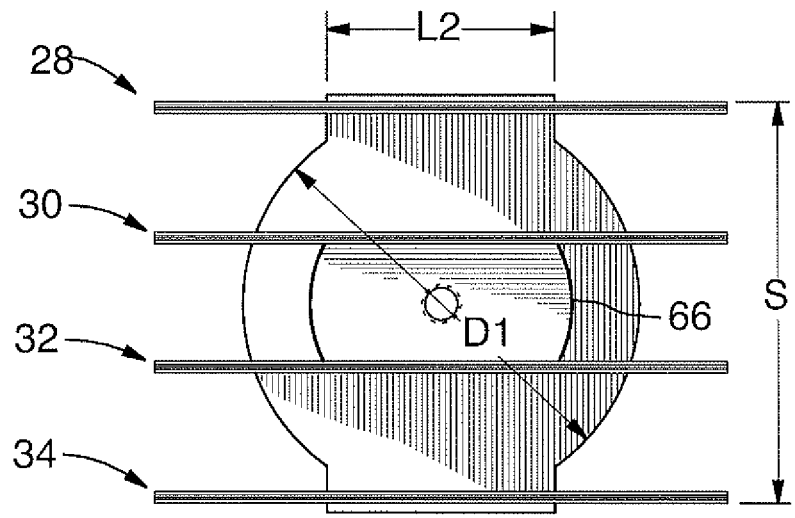
FIG. 4A is a view similar to FIG. 2A of a third embodiment of the mounting bracket.
Figure 4B:
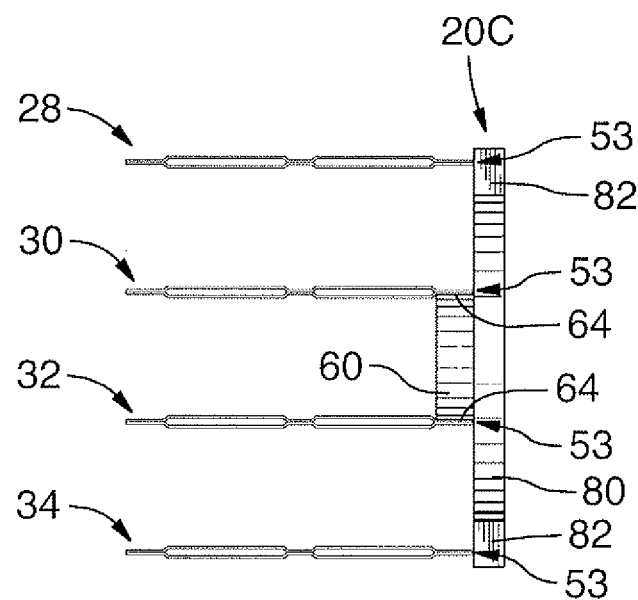
FIG. 4B is a side view of the structure of FIG. 4A.
Figure 4C:
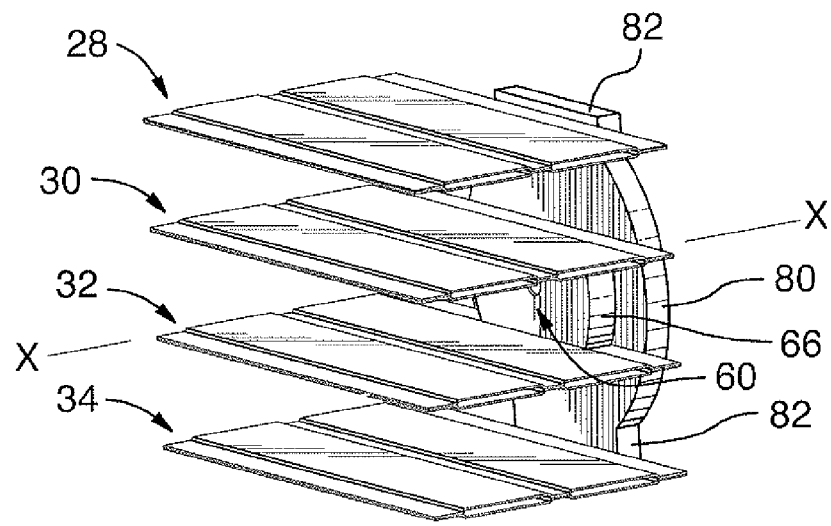
FIG. 4C is a rear, top, side perspective view of the structure of FIG. 4A.
Figure 4D:
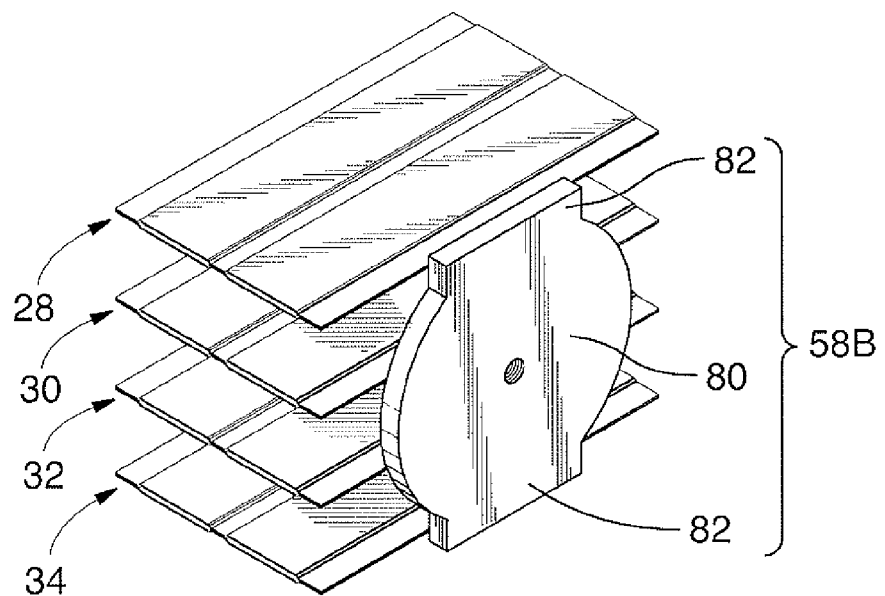
FIG. 4D is a front, top, side perspective view of the structure of FIG. 4A.

The third embodiment of the mounting bracket is shown in FIGS. 4A-4C. This embodiment 20C is similar to that shown in FIGS. 3A-3C, but herein the shapes of the plate-like part and wing parts differ. This plate-like part is a modified plate-like part in the form of a disc 80 coaxial with the cylindrical surface partially defined by the sides 66 of the filler portion 60 and has a diameter D1 of 34.4 mm, which is substantially equal to the spacing S between the tubes above 28 and below 34 the pair of adjacent tubes 30,32 in the stack. The wing plates are modified to take the form of stub projections 82, of uniform thickness with the modified plate-like part 80 and which project therefrom so as to overly the end surfaces 53 of the tubes above 28 and below 34 the pair of adjacent tubes 30,32 in the stack over a length L2 substantially equal to one half of the spacing S between the tubes above 28 and below 34 the pair 30,32.

Figure 5A:
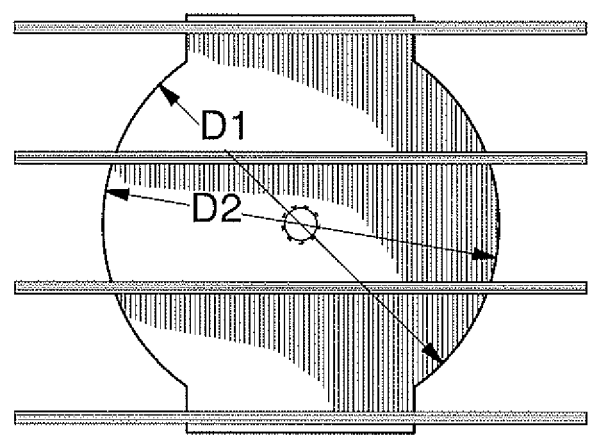
FIG. 5A is a view similar to FIG. 2A of a fourth embodiment of the bracket.
Figure 5B:
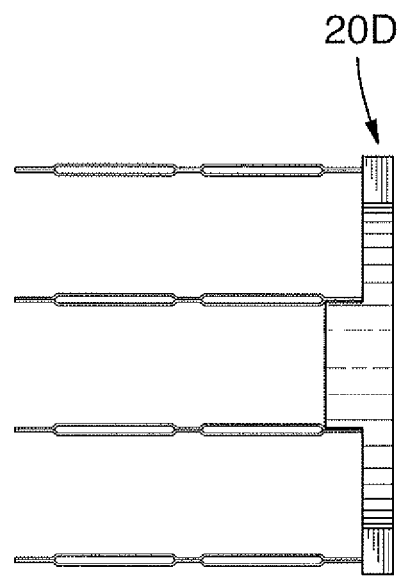
FIG. 5B is a side view of the structure of FIG. 5A.
Figure 5C:
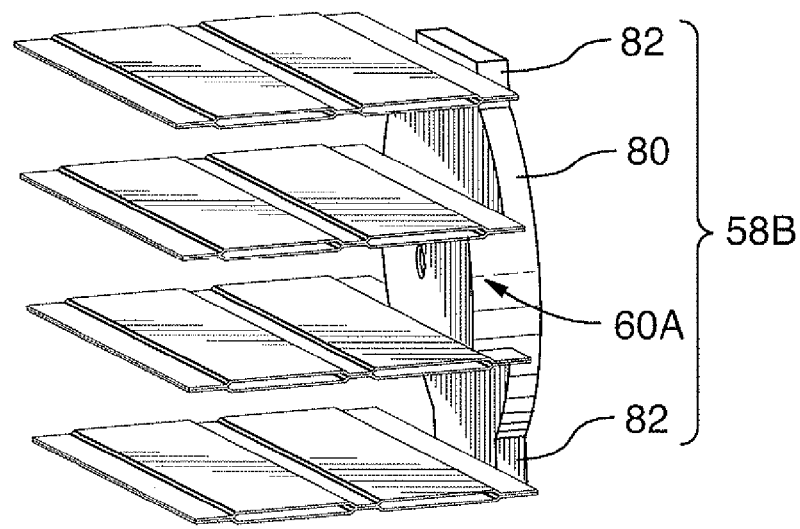
FIG. 5C is a rear, top, side perspective view of the structure of FIG. 5A.
Figure 5D:
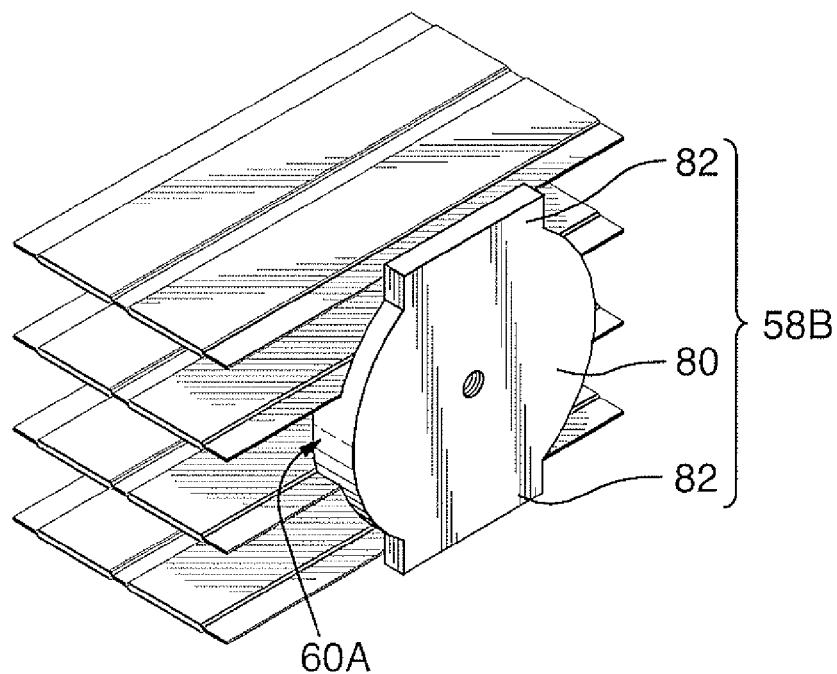
FIG. 5D is a front, top, side perspective view of the structure of FIG. 5A.

The fifth embodiment of the mounting bracket is shown in FIGS. 5A-5C. This embodiment 20D is substantially similar to the embodiment of FIGS. 4A-4D, but differs in that the filler portion is an enlarged filler portion 60A such that the cylindrical surface partially defined by the enlarged filler portion 60A has a diameter D2 substantially equal to that D1 of the modified plate-like part 80.

Figure 6A:
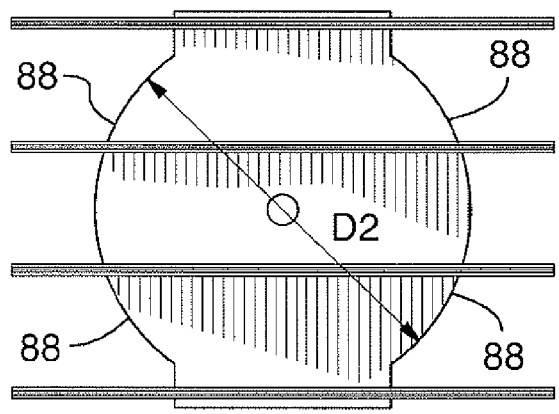
FIG. 6A is a view similar to FIG. 2A of a fifth embodiment of the mounting bracket.
Figure 6B:
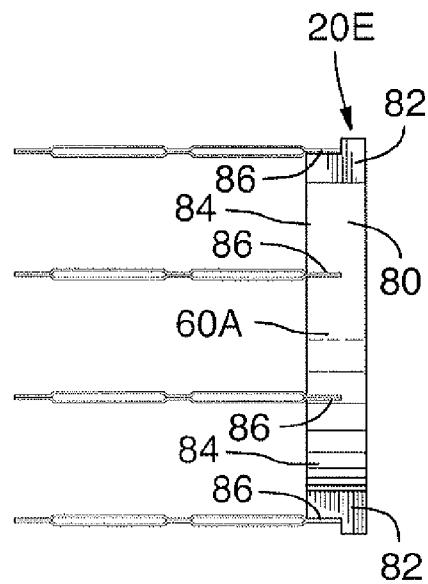
FIG. 6B is a side view of the structure of FIG. 6A.
Figure 6C:
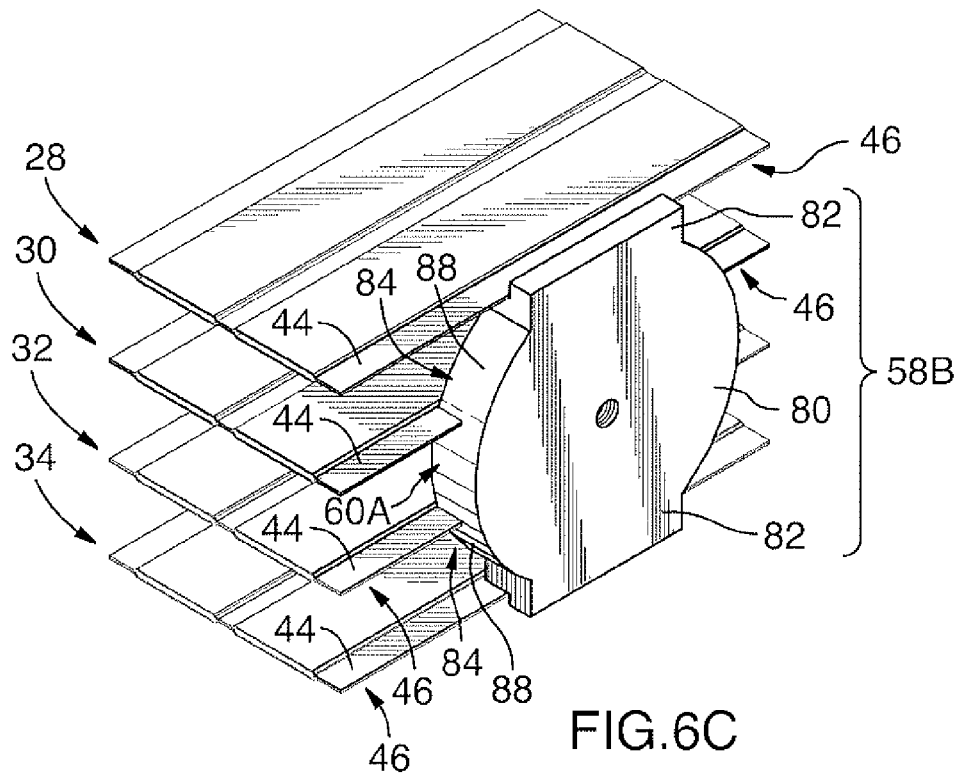
FIG. 6C is a front, top, side perspective view of the structure of FIG. 6A.
Figure 7A:
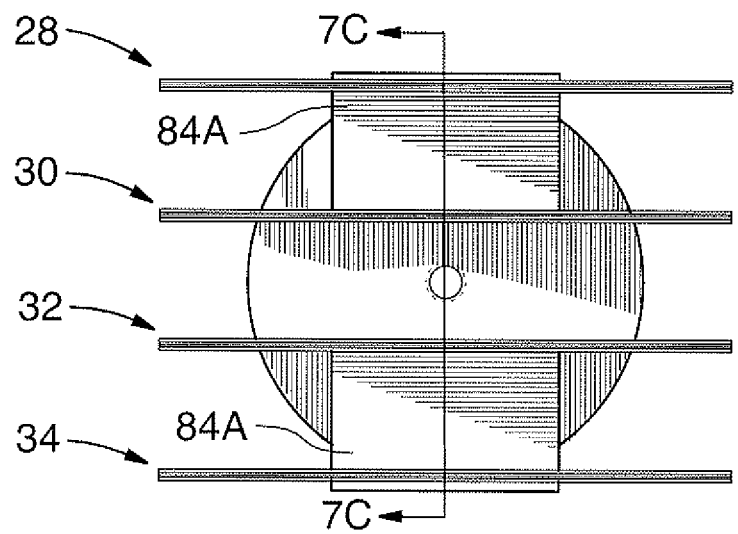
FIG. 7A is a view similar to FIG. 2A of a sixth embodiment of the mounting bracket.
Figure 7B:
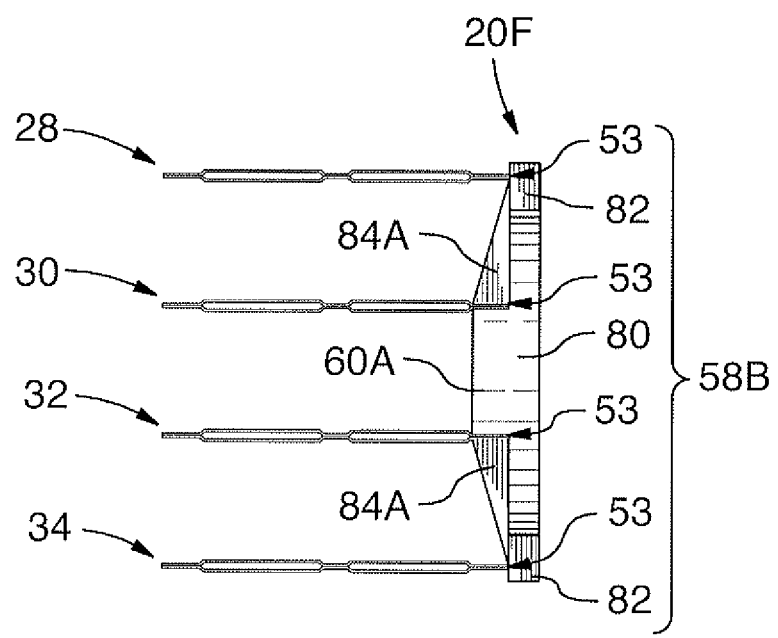
FIG. 7B is a side view of the structure of FIG. 7A.
Figure 7C:
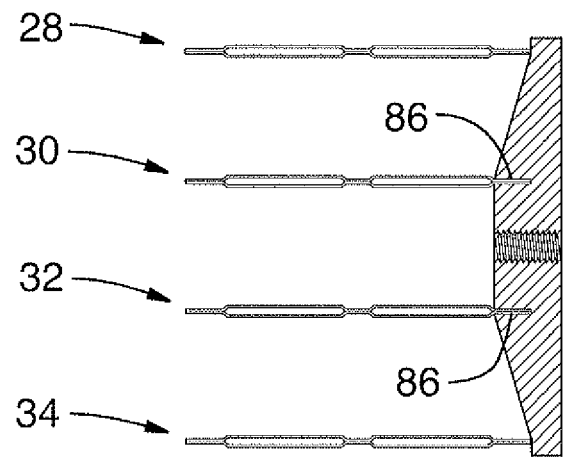
FIG. 7C is a view along section 7C-7C of FIG. 7A.
Figure 7D:
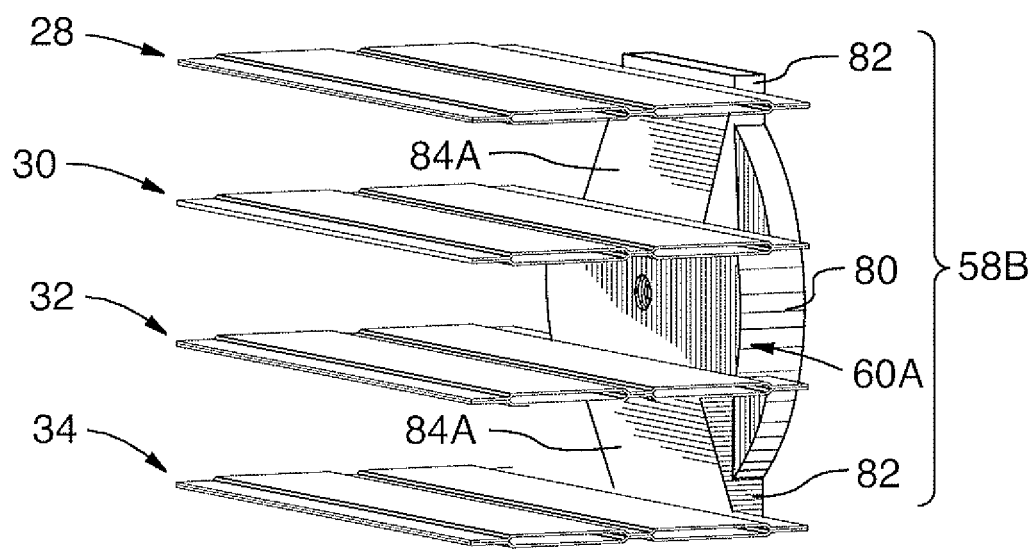
FIG. 7D is a rear, top, side perspective view of the structure of FIG. 7A.

The sixth embodiment of the mounting bracket is shown in FIGS. 6A-6C. This embodiment 20E is similar to the fifth embodiment 20D but further comprises, for each of the pair of tubes above 28 and below 34 the pair of adjacent tubes 30,32, a secondary filler portion 84 extending from the cap portion 58B and having a thickness or depth uniform with that of the filler portion 60A. The secondary filler portion 84, in use, is interleaved between said each tube 28,34 and the pair of adjacent tubes 30,32, has opposed faces 86 abutting and brazed to respective peripheral edge portions 44,46 of said each tube 28,34 and the adjacent one of the pair of adjacent tubes 30,32 and has semi-cylindrical sides 88 which extend between the opposed faces 86 of the secondary filler portion 84 and are aligned with the sidewall of the plate-like part 80, i.e. the cylinder substantially defined by the plate-like part 80 and the cylindrical surface partially defined by the secondary filler portions 84 and the modified filler portion 60A are substantially coaxial and of a substantially common diameter D2.

The seventh embodiment is shown in FIGS. 7A-7D. This embodiment 20F is similar to that of FIGS. 6A-6D, but herein, the secondary filler portions are modified second filler portions 84A, each being substantially the same width as the wings 82, and are wedge-shaped, tapering in thickness as they extend away from the filler portion 60A to a point which meets the tube 28,34 for which each modified second filler portion 84A is provided, such that the modified secondary filler portions 84A each have a single face 86 abutting and brazed to respective peripheral edge portions 44,46 of the adjacent one of the pair of adjacent tubes 30,32.

While but seven exemplary embodiments of the present invention have been herein shown and described in detail, it will be understood that various changes may be made.

Among other things, whereas the mounting bracket is specified to be of 6061-T6 aluminum, other grades of aluminum may be employed. As well, materials other than aluminum, such as brass, copper, copper alloys, plastics and stainless steel may be employed.

As well, whereas the mounting brackets specified have each been machined out of a single piece of material, i.e., for example, parts 84 and 60A are formed integrally and separated by a groove, brackets manufactured from multiple parts secured to one another could also be employed.

Further, whereas the mounting brackets herein illustrated are described to have been brazed to the core as part of the core manufacture process, this could be carried out as a subsequent step.

Additionally, whereas brazing is specified in the description as the method of attachment, the brackets could, for example, be secured by other means, such as epoxy.

Further, whereas specific dimensions are indicated in the exemplary embodiments described, these should be understood as being subject to change, and will change to reflect dimensions in the cores with which the brackets are used. Without limitation, the thickness of the cap and filler may vary from those dimensions set out. The respective thicknesses will be chosen to provide the rigidity desired of the components, as readily ascertainable by persons of ordinary skill in the art, and in the context of threaded fasteners, to provide sufficient threads in the bore to provide grip. However, it will be understood that the use of threaded fasteners as illustrated is not mandated, and other fastening mechanisms could be used. For example, a smooth bore could be provided, which could receive a barbed stud or a nut and bolt assembly to secure the component to the core. Alternatively the cap could be provided with a protruding deformable stud, or a protruding, rigidly secured threaded shaft. Yet further, the cap could take the form of a clip, which could receive a threaded nut, for subsequent receipt of a threaded shaft, bolt, etc.

Moreover, whereas in the illustrated embodiments, the cap spans 2 or 4 plates, it should be understood that the cap could span 3 plates, 5 plates or 6 plates, or indeed, span all of the tubes in the core, in which case, multiple filler portions might be employed.

As well, whereas various specific dimensions are set forth in the description, it will be understood that these are exemplary, only, and will be subject to change from application to application.

Additionally, whereas the brackets of the illustrated embodiments are shown attached to stacked plate type tubes, it will be understood that brackets of this type could be used with seam-welded, extruded or pan and cover type tubes, in which case, the cap portion would engage the side edges of tubes and the filler portion would engage upper and lower portions of adjacent tubes.

Yet further, it should be understood that whereas a monolithic filler portion is shown and described in the illustrations, each filler portion could equally be defined by a pair of discrete subportions each having a respective one of the opposed faced brazed or otherwise secured to a respective one of the adjacent tubes.

Accordingly, the invention should be understood as being limited only by the claims appended hereto, purposively construed.

The invention claimed is:

1. A mounting bracket for use in a stacked plate core device of the type having a plurality of tubes each defined by a plate pair including first and second plates having peripheral edge portions joined together and central planar portions spaced apart to define a fluid passage therebetween, the tubes being disposed in stacked relation to one another such that end surfaces of the joined peripheral edge portions define opposed faces of the core device, the mounting bracket comprising:
   a cap portion which, in use, is disposed against and brazed to a portion of one of the faces of the core device defined by end surfaces of a pair of adjacent tubes; and
   a filler portion extending from the cap portion and interleaved, in use, between the pair of adjacent tubes, the filler portion having faces abutting and brazed to respective peripheral edge portions of said adjacent tubes, said faces being substantially parallel and planar and facing in opposite directions.

2. A mounting bracket according to claim 1, wherein the cap portion and the filler portion are manufactured out of a single piece of material.

3. A mounting bracket according to claim 1, wherein the filler portion has semi-cylindrical sides which extend between the opposed faces of the filler portion.

4. A mounting bracket according to claim 3, wherein the cap portion is a disc.

5. A mounting bracket according to claim 4, wherein the disc and the semi-cylindrical sides of the filler portion are substantially coaxial and of a substantially common diameter.

6. A mounting bracket for use in a core device of the type having a plurality of tubes disposed in stacked, spaced relation to one another such that end surfaces of the tubes define opposed faces of the core device, the mounting bracket comprising:
   a cap portion which, in use, is disposed against and secured to a portion of one of the faces of the core device defined by end surfaces of a pair of adjacent tubes; and
   a filler portion extending from the cap portion and interleaved, in use, between the pair of adjacent tubes, the filler portion having faces abutting and secured to respective portions of said adjacent tubes, said faces being substantially parallel and planar and facing in opposite directions.

7. A mounting bracket according to claim 6, secured in use to said core device by brazing.

8. A mounting bracket according to claim 6, secured in use to said core device by adhesive.

\* \* \* \* \*